United States Patent
Gros-Borot et al.

(10) Patent No.: US 12,000,298 B2
(45) Date of Patent: Jun. 4, 2024

(54) DEVICE FOR PRESSURIZING TURBOMACHINE DOWNSTREAM ENCLOSURE, AND CORRESPONDING TURBOMACHINE

(71) Applicant: SAFRAN AIRCRAFT ENGINES, Paris (FR)

(72) Inventors: Maeva Daphne Gros-Borot, Moissy-Cramayel (FR); Clementine Charlotte Marie Mouton, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/250,346

(22) PCT Filed: Oct. 22, 2021

(86) PCT No.: PCT/FR2021/051863
§ 371 (c)(1),
(2) Date: Apr. 24, 2023

(87) PCT Pub. No.: WO2022/090654
PCT Pub. Date: May 5, 2022

(65) Prior Publication Data
US 2023/0399960 A1 Dec. 14, 2023

(30) Foreign Application Priority Data
Oct. 27, 2020 (FR) ........................................ 2010983

(51) Int. Cl.
*F01D 5/06* (2006.01)
*F01D 25/16* (2006.01)
(Continued)

(52) U.S. Cl.
CPC ................ *F01D 25/16* (2013.01); *F02C 7/06* (2013.01); *F01D 5/026* (2013.01); *F01D 5/06* (2013.01);
(Continued)

(58) Field of Classification Search
CPC . F01D 25/16; F01D 5/026; F01D 5/06; F02C 7/06; F05D 2220/323; F05D 2240/50
See application file for complete search history.

(56) References Cited

U.S. PATENT DOCUMENTS

| 6,582,187 B1 | 6/2003 | Shockley et al. |
| 2014/0150449 A1* | 6/2014 | Watson ................ F01D 25/125 415/176 |
| 2020/0088053 A1 | 3/2020 | Fiore et al. |

OTHER PUBLICATIONS

International Search Report and Written Opinion received for PCT Patent Application No. PCT/FR2021/051863, dated Feb. 23, 2022, 19 pages (10 pages of English Translation and 9 pages of Original Document).

* cited by examiner

*Primary Examiner* — Aaron R Eastman
(74) *Attorney, Agent, or Firm* — WOMBLE BOND DICKINSON (US) LLP

(57) ABSTRACT

A device for pressurizing a turbomachine downstream enclosure, the device being fed by means of a pressurizing air flow and including: a first shaft portion, a second shaft portion coupled to the first shaft portion via internal splines and external splines and extending, at a distance, inside the first shaft portion. The device includes at least a first passage made through the splines, and at least one orifice passing right through the second shaft portion, the orifice being arranged upstream of the first passage, in fluidic communication with the first passage, and opening out inside the second shaft portion so as to allow the pressurizing air flow (Continued)

to circulate from the first passage, between the first and second shaft portions, towards the downstream enclosure.

10 Claims, 3 Drawing Sheets

(51) Int. Cl.
  *F02C 7/06* (2006.01)
  *F01D 5/02* (2006.01)
(52) U.S. Cl.
  CPC .... *F05D 2220/323* (2013.01); *F05D 2240/50* (2013.01)

DEVICE FOR PRESSURIZING TURBOMACHINE DOWNSTREAM ENCLOSURE, AND CORRESPONDING TURBOMACHINE

FIELD OF THE INVENTION

The present invention relates to the turbomachine field and in particular to a device for pressurizing a turbomachine downstream enclosure. It also applies to the corresponding turbomachine.

TECHNICAL BACKGROUND

The prior art comprises the documents US-A1-2014/150449, US-A1-2020/088053 and US-B1-6582187.

15 The turbomachines generally comprise a drive shaft guided in rotation by rotary guide bearings. These bearings are arranged in one or more sealed lubrication enclosure or enclosures, each of which contains a lubrication mist for the bearings. The enclosures are pressurised so as to maintain the lubricant inside them. The leakage of lubricant outside the enclosure could create a risk of ignition and unbalance in the turbomachine, an excessive consumption of lubricant, and/or a risk of pollution of the cabin of the aircraft as well.

The enclosures are generally delimited by walls which are formed at least partly by stationary casings, rotor casings, bearing supports and/or a segment of the engine shaft. Sealing means are provided in the areas where the stationary and movable portions meet. Thus, a bearing enclosure typically comprises two sealing means located upstream and downstream of the enclosure. The enclosures are pressurised because the sealing means cannot ensure a perfect seal. In effect, the sealing means are conditioned so that a permanent air stream penetrates from outside the enclosure towards the inside of the enclosure through them, and thus prevents the lubricant from exiting the enclosure through them. The pressure around the enclosure is greater than the pressure within the enclosure to maintain the passage of the air stream through the sealing means from the outside of the enclosure towards the interior thereof. This air usually comes from a pressurised air source, such as high pressure or low pressure compressors.

In the case of a turbomachine with a very small "core area" (around the combustion chamber), integration constraints may arise at the level of the passage of a drive shaft such as the low-pressure turbine shaft passes through the smaller than usual "core area". The size of the "core area" requires a small diameter shaft (less than 100 mm) which does not allow to pass too much torque limiting the capacity of passage of torsion torque through it.

The pressurisation of the downstream enclosure of a turbomachine is classically made by a pressurisation (or ventilation) air flow which is collected at the level of the high-pressure compressor, most of the time upstream of the "core area". The presence of piercings made in certain locations of the drive shafts, which allow the passage of the pressurisation air flow towards the downstream enclosure, requires local allowances at the level of them in order to compensate for the stresses concentrations that may prevent the assembly of these shafts, such as the low-pressure shaft passing through the smaller "core area". The document US-B1-6582187 comprises piercings at the level of upstream connection means for the circulation of a cooling air flow towards the interior of the compressor or turbine discs. These piercings could not be made on a small engine.

SUMMARY OF THE INVENTION

The objective of the present invention is to provide a pressurisation of a turbomachine downstream enclosure without impacting the mass and affecting the architecture thereof.

This is achieved, in accordance with the invention, by means of a device for pressurising a downstream enclosure of a turbomachine with a longitudinal axis X, the device being supplied by means of a pressurisation air flow collected upstream of the turbomachine along the longitudinal axis, the device comprising:
  a first shaft segment extending along the longitudinal axis X,
  a second shaft segment coupled to the first shaft segment via longitudinal internal splines carried by the first shaft segment and longitudinal external splines carried by the second shaft segment, the second shaft segment extending at least partly inside the first shaft segment with a radial distance along a radial axis Z perpendicular to the longitudinal axis X,
  the device comprising at least one first passage made through the internal and external splines, and at least one orifice passing through the second shaft segment on either side along the radial axis, the orifice being arranged upstream of the first passage and on the one hand being in fluidic communication with the first passage and on the other hand opening out inside the second shaft segment so as to allow the pressurisation air flow to circulate from the first passage between the first shaft segment and the second shaft segment, then through the orifice towards the downstream enclosure of the turbomachine.

Thus, this solution allows to achieve the above-mentioned objective. In particular, such a configuration allows the downstream enclosure to be pressurised by circulating the pressurisation air flow from the collecting point (located at the level of the high pressure compressor) to the downstream enclosure of the turbomachine (in particular of the low pressure turbine). The location of the orifice in the second shaft segment upstream of the splines allows to avoid piercing the second shaft segment in an area where the torque is passing, which would result in an allowance of the shaft at the level of the piercing to hold the stress concentration (the forces passing into the second shaft segment are at the level of the splines and downstream of the splines, there is no force passing into the shaft on the portion located upstream of the splines). In addition, the orifice in a shaft and the passage between the splines of the shafts are simple to make and do not require significant structural changes to the existing parts of the turbomachine.

The device also comprises one or more of the following characteristics, taken alone or in combination:
  the internal and external splines comprise faces that contact each other.
  the first shaft segment is a low pressure compressor shaft.
  the second shaft segment is a low pressure turbine shaft.
  the internal and external splines are configured so as to create pairs of internal and external splines in an adjacent manner in a circumferential direction and empty inter-spline spaces forming first passages.
  the first passages occupy an angular range a, measured between one lateral flank of an internal or external spline and another lateral flank of an internal or external spline which are spaced apart, and which is between 35° and 55°.

the first passages are alternated with series of splines having faces in contact with each other in the circumferential direction.

the first shaft segment or the second shaft segment comprises a series of teeth which are arranged downstream of the internal and external splines and configured so as to carry out a function of centring the first shaft segment with respect to the second shaft segment.

at least one second passage is made through the teeth.

the teeth are spaced apart from each other in a circumferential direction so as to create empty inter-tooth spaces forming second passages.

the internal and external splines have a similar cross-sectional shape and dimensions and the teeth each have a similar cross-sectional shape and dimensions.

the first passages and the second passages are evenly distributed around the longitudinal axis.

the first shaft segment comprises at least one opening passing through its wall on either side, the opening being located downstream of the second passage and being intended to open out inside the first shaft segment.

the pressurising device comprises a first shaft comprising the first shaft segment and the second shaft segment, and a second shaft within which the first shaft extends at least partly, the second shaft comprising at least one hole passing through its wall on either side, the hole being intended to be arranged in the vicinity of the downstream enclosure so that the pressurisation air flow leaving the orifice or orifices penetrates inside the downstream enclosure.

the first shaft segment comprises a plurality of orifices that are evenly distributed around the longitudinal axis.

the splines are straight and parallel to the longitudinal axis.

the number of internal longitudinal splines is less or more than the number of external longitudinal splines.

The invention also relates to an aircraft turbomachine comprising a propeller, a gas generator for driving the propeller in rotation about the longitudinal axis X and a device for pressurising a downstream enclosure as aforesaid.

In one characteristic, the downstream enclosure is arranged downstream of a combustion chamber of the gas generator.

The invention further relates to an aircraft comprising a turbomachine as mentioned above.

BRIEF DESCRIPTION OF THE FIGURES

The invention will be better understood, and other purposes, details, characteristics and advantages thereof will become clearer upon reading the following detailed explanatory description of embodiments of the invention given as purely illustrative and non-limiting examples, with reference to the appended schematic drawings in which.

DETAILED DESCRIPTION OF THE INVENTION

The invention applies to a high propulsion efficiency (small high pressure body size) turbomachine 1. The example of the turbomachine shown in FIG. 1 comprises a single propeller 2 and a straightener 25 downstream of the propeller 2. This propeller 2 is un-ducted. The turbomachine is intended to be mounted on an aircraft. Such a turbomachine is a turboprop engine as shown in FIG. 2. This turbomachine is known as a "Single Un-ducted Fan" as explained above. Of course, the invention is applicable to other types of turbomachine, and in particular those smaller than a conventional turbomachine (e.g. a turbofan double flow and double body engine).

In the present invention, and in general, the terms "upstream", "downstream", "axial" and "axially" are defined with respect to the circulation of the gases in the turbomachine and here along the longitudinal axis X (and even from left to right in FIG. 2). Similarly, the terms "radial", "internal" and "external" are defined with respect to a radial axis Z perpendicular to the longitudinal axis X and with respect to the distance from the longitudinal axis X.

Furthermore, the identical or substantially identical elements and/or the elements with the same functions are represented by the same numerical references.

Figure 1:
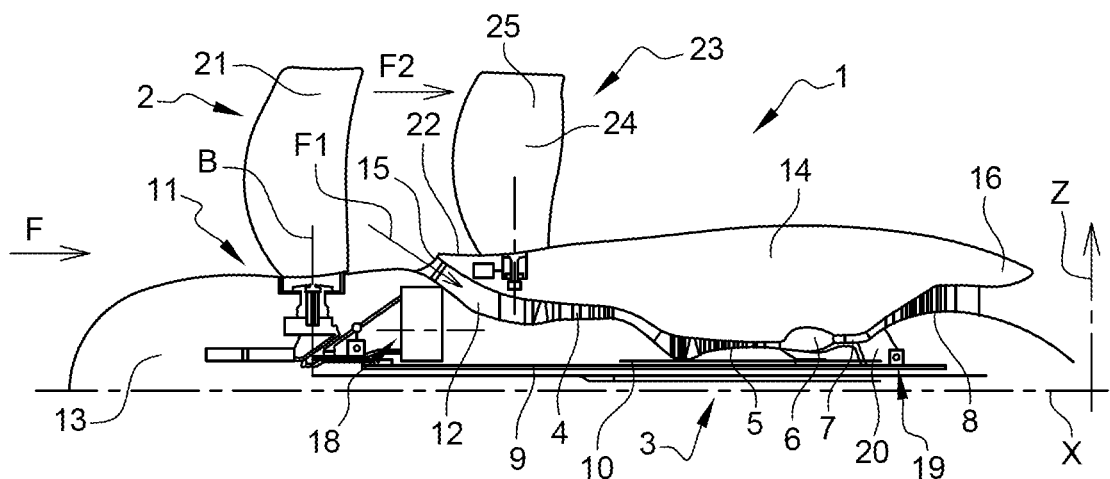
FIG. 1 shows in axial cross-section an example of turbomachine comprising a single propeller and a straightener of the stator vanes to which the invention applies.
Figure 2:
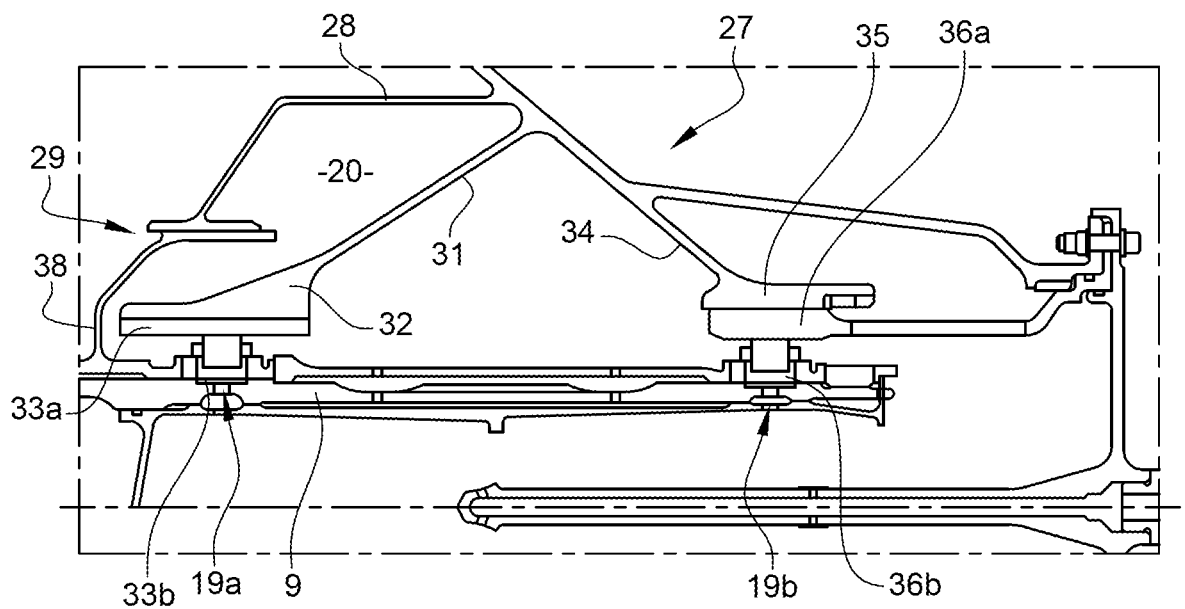
FIG. 2 illustrates an example of a downstream enclosure in axial cross-section which contains at least one bearing according to the invention.

In FIG. 1, the turbomachine 1 comprises a gas generator 3 which typically comprises, from upstream to downstream, a low-pressure compressor 4, a high-pressure compressor 5, a combustion chamber 6, a high-pressure turbine 7 and a low-pressure turbine 8. The low-pressure compressor 4 and the low-pressure turbine 8 are mechanically connected by a low-pressure shaft 9 so as to form a low-pressure body. The high-pressure compressor 5 and the high-pressure turbine 7 are mechanically connected by a high-pressure shaft 10 so as to form a high-pressure body. The low pressure shaft 9 extends inside the high pressure shaft 10 and are coaxial.

In another configuration not shown, the low or weak-pressure body comprises the low-pressure compressor which is connected to an intermediate pressure turbine. A free power turbine is mounted downstream of the intermediate pressure turbine and is connected to the propeller described below via a power transmission shaft to drive it in rotation.

The propeller 2 is formed by a ring of movable blades 21 which extend from a rotating casing 11 which is movable in rotation about the longitudinal axis. In the example shown in FIG. 2, the propeller 2 is mounted upstream of the gas generator (puller configuration). Alternatively, the propeller is mounted downstream of the gas generator (pusher configuration).

The straightener 23 comprises a plurality of stator vanes 24 (or stationary vanes) known as "OGV" for Outlet Guide Vane. The stator vanes 24 are evenly distributed around the longitudinal axis X. The stator vanes 24 may be of variable pitch.

An air flow F entering the turbomachine splits into a primary air flow and a secondary air flow F2 at the level of a splitter nose 22 carried by an external casing 14. The primary air flow F1 circulates in a primary duct 12 which passes through the gas generator 3 (radially between an internal casing 13 and the external casing 14) via an annular air inlet 15 and exits through a primary nozzle 16 which is arranged downstream of the gas generator 3. The secondary air flow F2 passes through the blades 21 of the propeller, the blades 25 of the straightener 23 and circulates around the external casing 14. The power shaft or the low pressure shaft 9 (of the free power turbine and the low pressure turbine respectively) drives the propeller 2 which compresses the air flow outside the external casing 14 and provides most of the thrust. Optionally, a reducer 18 is interposed between the propeller 2 and the power shaft as shown in FIG. 2. The reducer 18 can be of the planetary gear train or epicyclic gear train type.

The low-pressure shaft 9 is driven in rotation about the longitudinal axis by means of rotary guide bearings. These bearings are mounted upstream and downstream of the low pressure shaft 9 and are housed in lubrication enclosures. As mentioned earlier, these enclosures must be pressurised to maintain the lubricant mist (in this case oil) inside the enclosures. In general, the higher the pressure outside the same, the easier it is to ensure the sealing. The pressure outside is ensured by a pressurising circuit or a pressurising device 30 supplied with a pressurisation or ventilation air flow.

In particular, at least one downstream bearing 19 (FIG. 2) is arranged in an annular downstream enclosure 20 which is centred on the longitudinal axis X. The annular enclosure 20 shown in more detail in FIG. 2 is arranged downstream of the high pressure compressor 5. The downstream enclosure 20 is delimited at least partly by a bearing support 27 which comprises an upstream radially external wall 28 which is attached to a stationary structure of the turbomachine. The radially external wall 28 cooperates via the upstream sealing means 29 with a ferrule 38 attached to the low pressure shaft 9. The bearing support 27 also comprises in this example a first upstream branch 31 that carries at a first end an upstream base plate 32. This upstream base 32 is attached to an external ring 33a of a first downstream bearing 19a. The bearing support 27 also comprises a second branch 34 that carries a downstream base plate 35 at a first end. The latter is attached to an external ring 36a of a second downstream bearing 19b. The enclosure 20 is also delimited partly by a radially internal wall. A segment of the low pressure shaft 9 forms a radially internal wall portion of the downstream enclosure 20. The low-pressure shaft 9, and in particular the low-pressure compressor shaft described later, carries the internal rings 33b, 36b of the first and second downstream bearings 19a, 19b.

The sealing means 29 typically comprise a labyrinth seal or a segmented radial seal.

Figure 7:
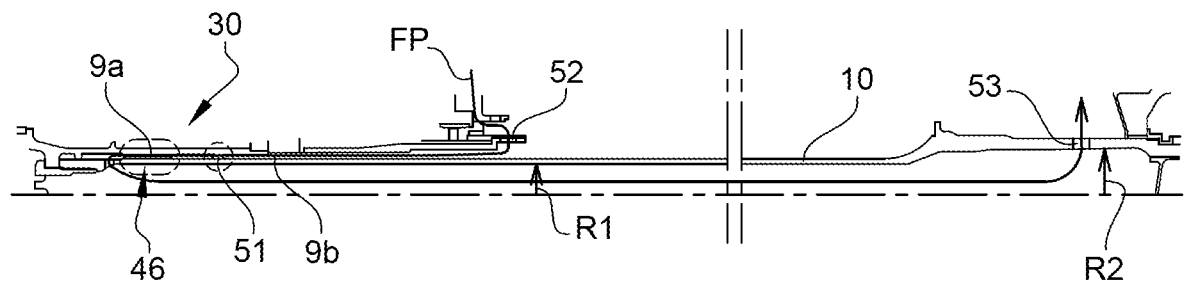
FIG. 7 illustrates in an axial cross-section an example of a pressurisation air flow path towards the downstream enclosure according to the invention.

With reference to FIG. 7, the pressurisation air flow FP is collected from upstream of the turbomachine and in particular from the first stages of the high pressure compressor 5. The pressurising device 30 is configured so as to allow the circulation of the pressurisation air flow between a first shaft and a second shaft from the high pressure compressor 5 to the downstream enclosure 20. To this end, the pressurising device 30 comprises a first segment of the shaft 9a extending along the longitudinal axis X and a second shaft segment coupled to the first segment of the shaft 9a via coupling means described below. In particular, the pressurising device 30 comprises the first shaft extending along the longitudinal axis X and a second shaft extending at least partly outside the first shaft and being coaxial with the axis X. The first shaft is then hollow. The second shaft is also hollow. The second shaft extends radially away from the first shaft so as to allow the circulation of the pressurisation air flow between their internal and external surfaces.

In this example, the first shaft is the low pressure shaft 9 and the second shaft is the high pressure shaft 10.

Figure 3:
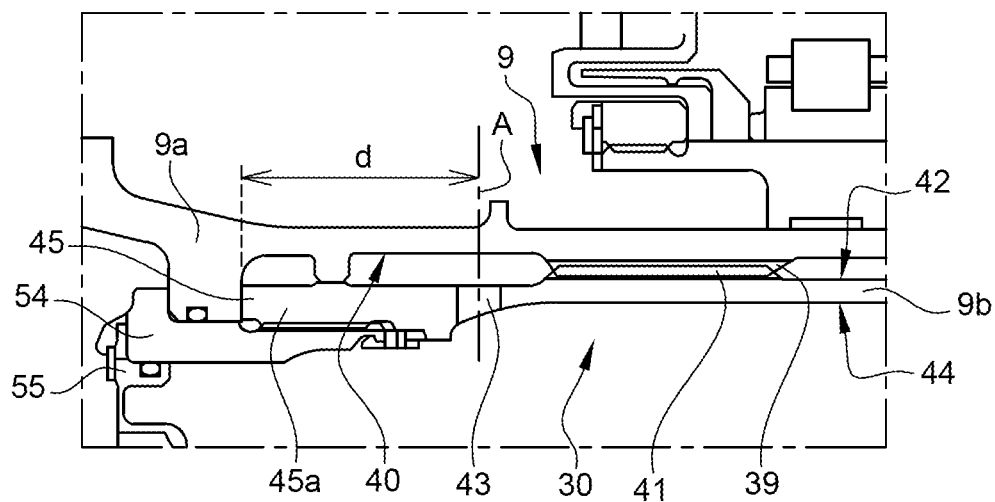
FIG. 3 is an axial, partial cross-sectional and detail view of an internal shaft and an external shaft forming part of a pressurising device according to the invention.
Figure 4:
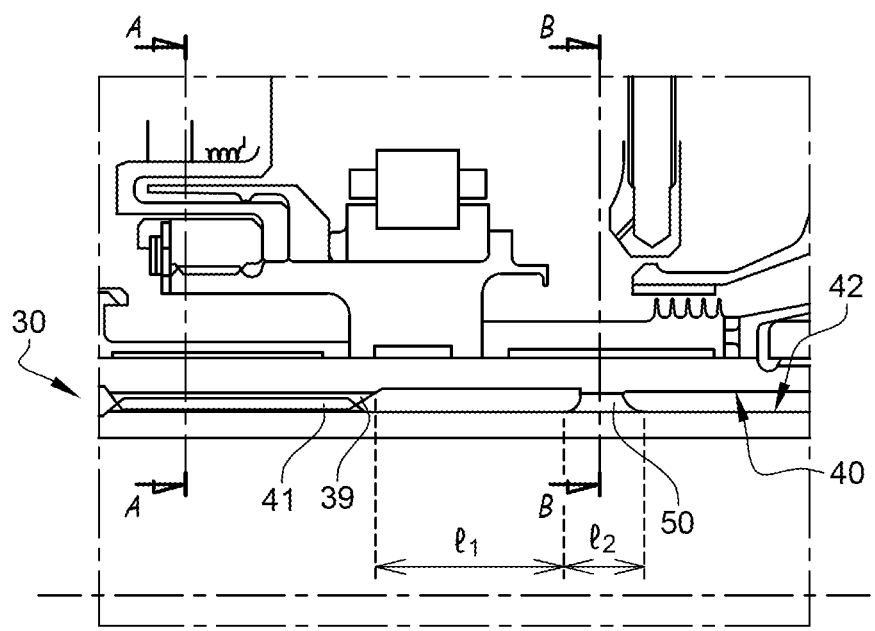
FIG. 4 shows, in axial cross-section, coupling means cooperating with each other to secure the internal and external shafts in rotation and means for centering the shafts according to the invention.

With reference to FIGS. 3 and 4, the low pressure shaft 9 comprises a low pressure compressor shaft 9a and a low pressure turbine shaft 9b which are rotationally secured by coupling means. The first shaft segment is the low pressure compressor shaft and the second shaft segment is the low pressure turbine shaft. The coupling means comprise internal longitudinal splines 39 which are carried on an internal surface 40 of the low pressure compressor shaft 9a. The internal splines 39 extend radially inwards from the internal surface 40. The coupling means also comprises longitudinal external splines 41 which are carried by the external surface 42 of the low pressure turbine shaft 9b. The external splines 41 extend radially outwards from the external surface 42 of the low pressure turbine shaft 9b. The internal and external splines 39, 41 extend along the longitudinal axis and are distributed around the longitudinal axis X. They are straight. The coupling of the splines 39, 41 allows the transmission of a torque from the low pressure turbine shaft 9b to the low pressure compressor shaft 9a.

Figure 5:
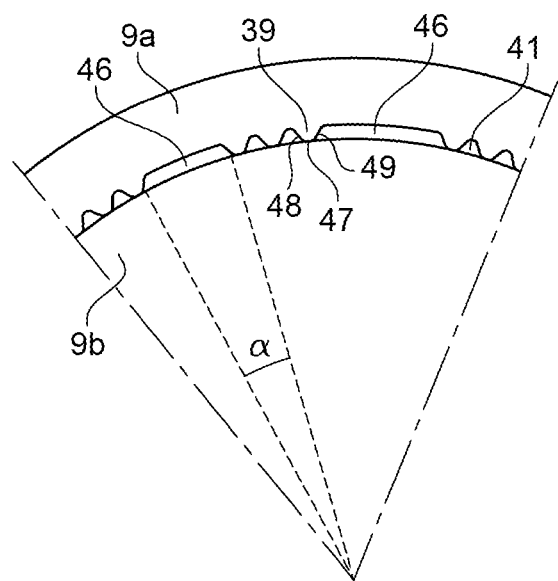
FIG. 5 is a partial view along a section A-A of an internal shaft and a external shaft shown in FIG. 4 and equipped with coupling splines according to the invention.
Figure 6:
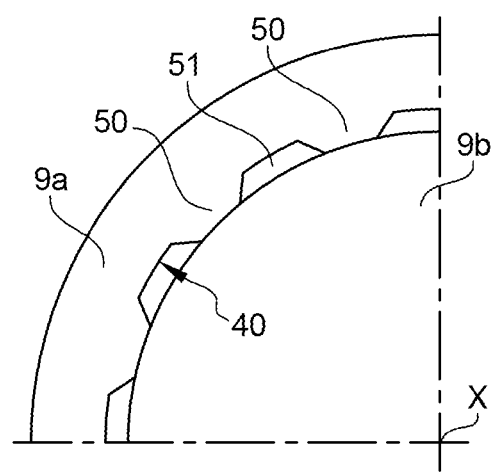
FIG. 6 is a partial view along a section B-B of an internal shaft and an external shaft shown in FIG. 4 and equipped with centering teeth according to the invention.

With reference to FIGS. 3 and 5, the pressurising device 30 comprises at least one first passage 46 made through the internal and external splines 39, 41. In FIG. 5, which shows a view in section A-A of the shafts in FIG. 4, the splines 39, 41 are configured so as to create pairs of adjacent internal and external splines 39, 41 in a circumferential direction around the longitudinal axis and also empty inter-spline spaces forming the first passage 46.

To achieve this, the splines are substantially similar in shape and dimension so that when they are coupled, all faces are in contact with each other. The splines in this example are generally trapezoidal in shape. In particular, each spline 39, 41 comprises a summit 47, which is flat in this case and is delimited by two lateral flanks 48, 49. In the present example, the lateral flanks 48, 49 are defined in planes which are inclined to each other and to the radial axis respectively. The angle of inclination here is between 30° and 60°. The flanks could be straight, of course, or have other shapes as long as they cooperate with each other and are in contact.

Several first passages 46 are arranged regularly around the longitudinal axis. FIG. 5 shows two of these first passages 46 which are spaced apart by internal and external splines 39, 41. The first passages 46 extend in a circumferential direction. The first passages 46 occupy an angular range (circumferential length) a, measured between a lateral flank of an internal or external spline and another lateral flank of an internal or external spline that are spaced apart. The angular range can be between 35° and 55°. These first passages 46 have been created by "removing" internal splines and/or external splines. In this case the number of internal and external splines are different. The number of internal splines is less or more than the number of external splines. In the example shown, there are more internal splines than external splines. We can see in FIG. 5 that between each first passage 46 there are three internal splines 39 coupling with two external splines 41. The pressurisation air flow FP passes only through the first passages 46; with the faces (summits/ lateral flanks) of the splines in (tight) contact with each other. These create a seal or block the passage of the flow FP. In other words, the passages 38 are wider than simple spaces formed by a possible clearance between adjacent and contacting faces of the splines as is the case in some turbomachines of the prior art. The pressurised air circulates unobstructed and without pressure loss towards the upstream enclosure to be pressurised with such a configuration.

In FIG. 3, the pressurising device 30 comprises at least one orifice 43 which passes through the wall of the low pressure turbine shaft 9b on both sides. The axis A of the orifice 43 is parallel to the radial axis Z. The orifice comprises an inlet and an outlet. The inlet faces an internal surface segment 40 of the low pressure compressor shaft 9a. The orifice 43 is arranged upstream of the splines 39, 41. Such an arrangement allows to avoid piercing the shaft at the level of the connection means, which in this case are splines, so as not to cause any allowance of the shaft at the level of the piercing and hold the stress concentration. Several orifices 43 are made in the wall and are distributed regularly around the axis X. In particular, each orifice 43 opens out into the external surface 42 of the low pressure turbine shaft 9b on the one hand and into the internal surface 44 of the low pressure turbine shaft 9b on the other hand. In other words, the orifice 43 opens out inside the low pressure turbine shaft 9b.

Each orifice 43 is located in the vicinity of an end 45 of the low pressure turbine shaft 9b. In particular, the axis A of each orifice 43 is located at a predetermined distance d from the end 45. The distance between the axis A and the end 45 defines an end segment 45a onto which a nut 54 is screwed. The latter allows the low pressure turbine shaft 9b and the low pressure compressor shaft 9a to be tightened. This segment of end 45a has been "added" to the low pressure turbine shaft 9b compared to a conventional low pressure turbine shaft. The segment of end 45a has allowed to add the orifices 43. An anti-rotation member 55 is provided to oppose the rotation of the tightening nut 54. The anti-rotation member is mounted radially inside the nut 54. The anti-rotation member 55 also acts as a sealing plug and allows to prevent the oil leakage.

Each orifice 43 is located upstream of at least one first passage 46 and is in fluidic communication with the first passage 46 so as to allow the circulation of the pressurised air flow from upstream between the concentric shafts 9a, 9b towards the downstream enclosure 20 of the turbomachine.

The low-pressure compressor shaft 9a and the low-pressure turbine shaft 9b comprise means for centering on the longitudinal axis X. These centering means comprise teeth 50 here internal which are carried by the low pressure compressor shaft 9a. These teeth 50 rise radially from the internal surface 40 towards the low pressure turbine shaft 9b. Alternatively, the teeth are arranged on the external surface of the low pressure turbine shaft. The teeth 50 are substantially similar in shape and dimensions. As with the splines, each tooth 50 comprises a flat summit and flat lateral flanks. The summit of each tooth 50 is supported against the external surface of the low pressure compressor shaft 9a. These teeth 50 are located downstream of the internal and external splines 33, 34.

The pressurising device 30 also comprises at least one second passage 51 which is made through the teeth 50. As with the splines 39, 41, the teeth 50 are spaced apart so as to create empty inter-tooth spaces forming the second passages 51. In this way, the pressurisation air flow FP circulates between two adjacent but spaced apart teeth 50. The second passages 51 are distributed around the longitudinal axis.

As can also be seen in FIG. 4, the teeth are separated axially from the internal and/or external splines by a first distance 11 which is greater than the axial dimension 12 of the teeth 50. In the example shown, the distance 11 is less than the axial dimension of the splines.

In FIG. 7, the low-pressure compressor shaft 9a comprises at least one opening 52 towards the high-pressure compressor 5, which passes through its wall radially on both sides. In other words, the opening 52 is located axially downstream of the second passages 51 and opens out into the low pressure compressor shaft 9a. In particular, the shaft 9a comprises a number of openings 52 evenly distributed around the axis X. As can also be seen, the high-pressure shaft 10 comprises at least one hole 53 which passes through its wall on both sides and which is downstream of the high-pressure body, close to the low-pressure turbine of axis parallel to the radial axis Z. The hole 53 is located downstream of the high-pressure body and near the low-pressure turbine. Advantageously, several holes 53 are distributed around the circumference of the high pressure shaft 10. The holes are arranged axially downstream of the orifices 43

In this way, the pressurisation air flow FP, which is collected from the high pressure compressor 5, passes through the openings 52 of the low pressure compressor shaft 9a, circulates between the internal surface of the low pressure compressor shaft 9a and the external surface of the low pressure turbine shaft 9b to the second passages 51 (as shown in dotted line in FIG. 7), then to the first passage 46 (as shown in dotted line in FIG. 7) before entering inside the low pressure turbine shaft 9b and being evacuated through the holes 53. The pressure difference between upstream and downstream allows the pressurisation air flow to circulate. The different passages, holes, orifices, allow to minimize the pressure losses and thus to keep the pressure from the supply of the pressurisation air flow.

The invention claimed is:

1. A device for pressurising a downstream enclosure of a turbomachine with a longitudinal axis X, the device being supplied by means of a pressurisation air flow (FP) collected upstream of the turbomachine along the longitudinal axis, the device comprising:
    a first shaft segment extending along the longitudinal axis X,
    a second shaft segment coupled to the first shaft segment via longitudinal internal splines carried by the first shaft segment and longitudinal external splines carried by the second shaft segment, the second shaft segment extending at least partly inside the first shaft segment with a radial distance along a radial axis Z perpendicular to the longitudinal axis X, the internal and external splines comprising faces respectively,
    wherein it comprises at least one first passage made through the internal and external splines, and at least one orifice passing through the second shaft segment on either side along the radial axis, the orifice being arranged upstream of the first passage and, on the one hand, being in fluidic communication with the first passage and, on the other hand, opening out inside the second shaft segment so as to allow the circulation of the pressurisation air flow (FP) from the first passage between the first shaft segment and the second shaft segment, then through the orifice towards the downstream enclosure of the turbomachine and in that the internal and external splines are configured so as to create pairs of internal and external splines adjacently along a circumferential direction, with faces in contact with each other, and empty inter-spline spaces forming first passages.

2. The pressurising device according to claim 1, wherein the first passages occupy an angular range (a), measured between a lateral flank of an internal or external spline and another lateral flank of an internal or external spline which are spaced apart, and which is between 35° and 55°.

3. The pressurising device according to claim 1, wherein the first shaft segment or the second shaft segment comprises a series of teeth which are arranged downstream of the internal and external splines and configured so as to carry out a function of centring the first shaft segment with respect to the second shaft segment.

4. The pressurising device according to claim 3, wherein at least one second passage is made through the teeth.

5. The pressurising device according to claim 4, wherein the first passages and the second passages are evenly distributed around the longitudinal axis.

6. The pressurising device according to claim 4, wherein the first shaft segment comprises at least one opening passing through its wall on either side, the opening being located downstream of the second passage and being intended to open out inside the first shaft segment.

7. The pressurising device according to claim 3, wherein the teeth are spaced apart from each other in a circumferential direction so as to create empty inter-tooth spaces forming second passages.

8. The pressurising device according to claim 3, wherein the internal and external splines have a similar cross-sectional shape and dimensions and the teeth each have a similar cross-sectional shape and dimensions.

9. The pressurising device claim 1, wherein it comprises a first shaft comprising the first shaft segment and the second shaft segment, and a second shaft within which the first shaft extends at least partly, the second shaft comprising at least one hole passing through its wall on either side, the hole being intended to be arranged in the vicinity of the downstream enclosure in such a way that the pressurisation air flow leaving the orifice or orifices penetrates inside the downstream enclosure.

10. An aircraft turbomachine comprising a propeller rotating about a longitudinal axis X, a gas generator for driving the propeller in rotation, and a device for pressurising a downstream enclosure according to claim 1.

* * * * *